No. 892,142.
PATENTED JUNE 30, 1908.
P. DUPONT.
APPARATUS FOR MOLDING.
APPLICATION FILED MAY 18, 1905.
4 SHEETS—SHEET 3.
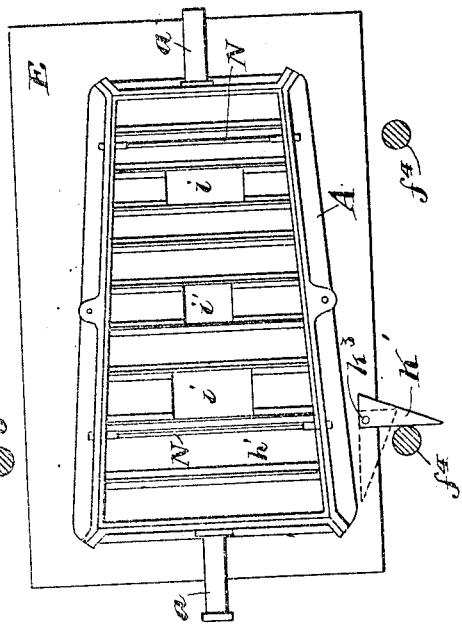
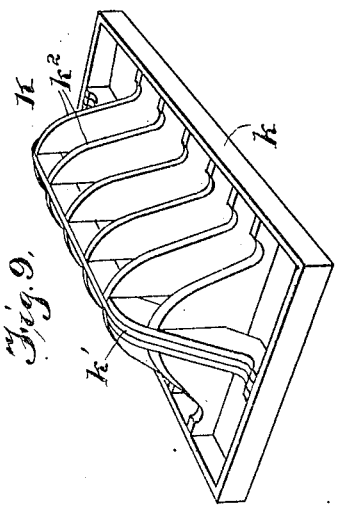
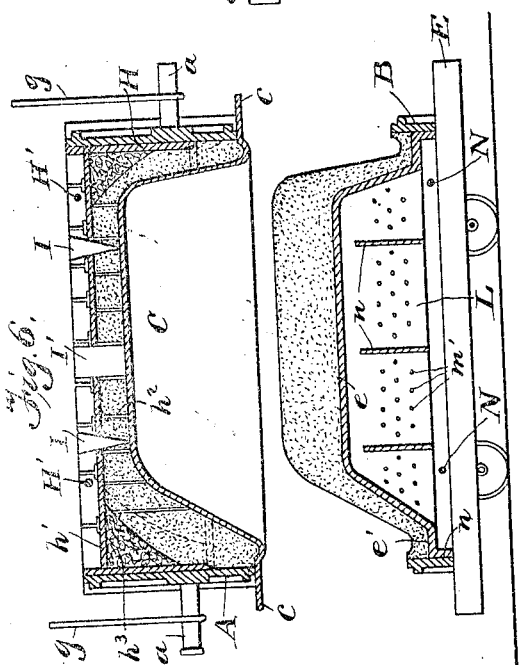
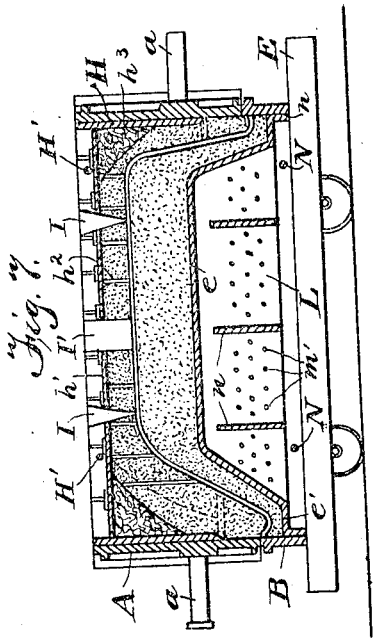
WITNESSES:
Robert Head
V. E. Nichols
INVENTOR
Paul Dupont,
BY
Griffin & Bernhard
ATTORNEYS.

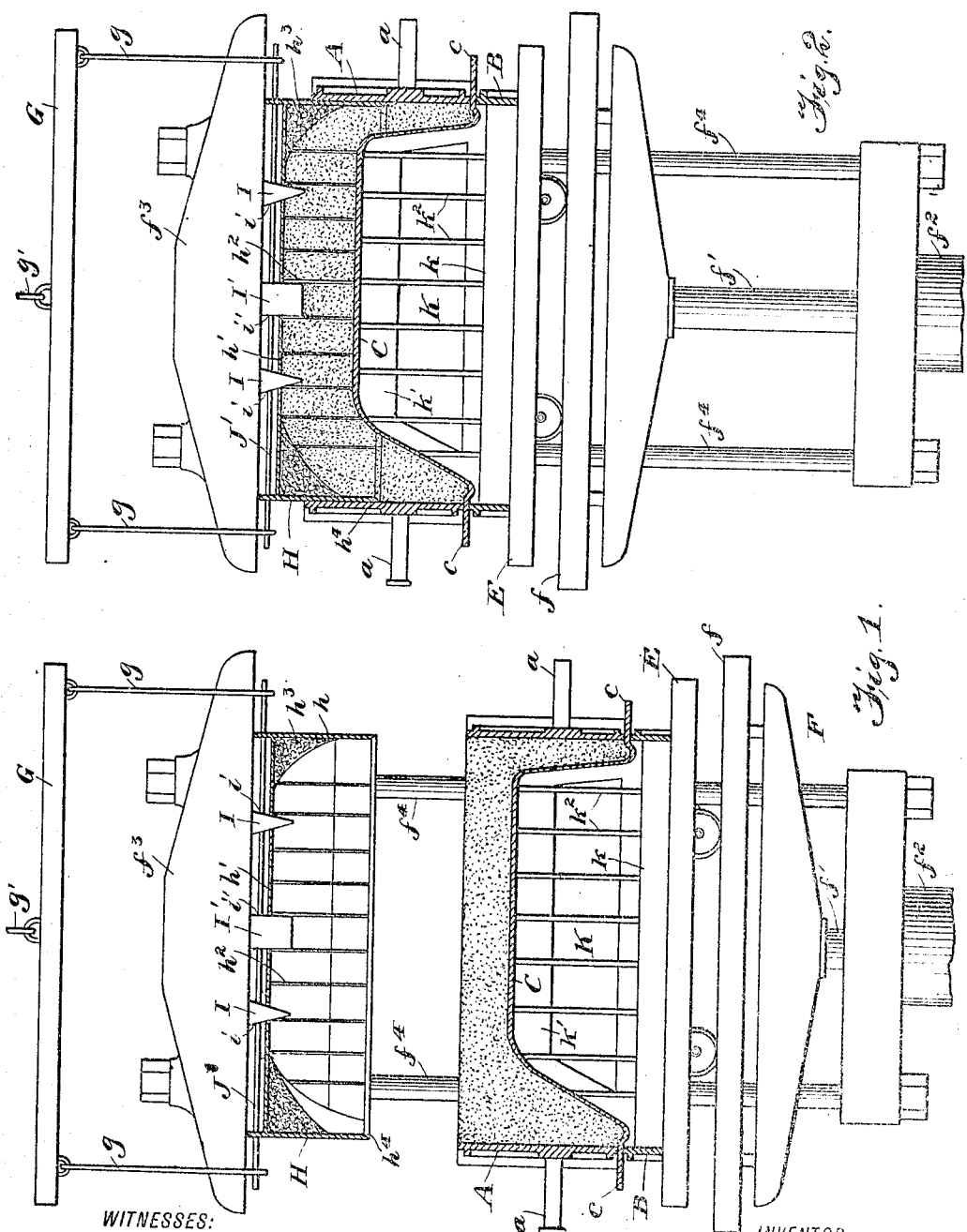

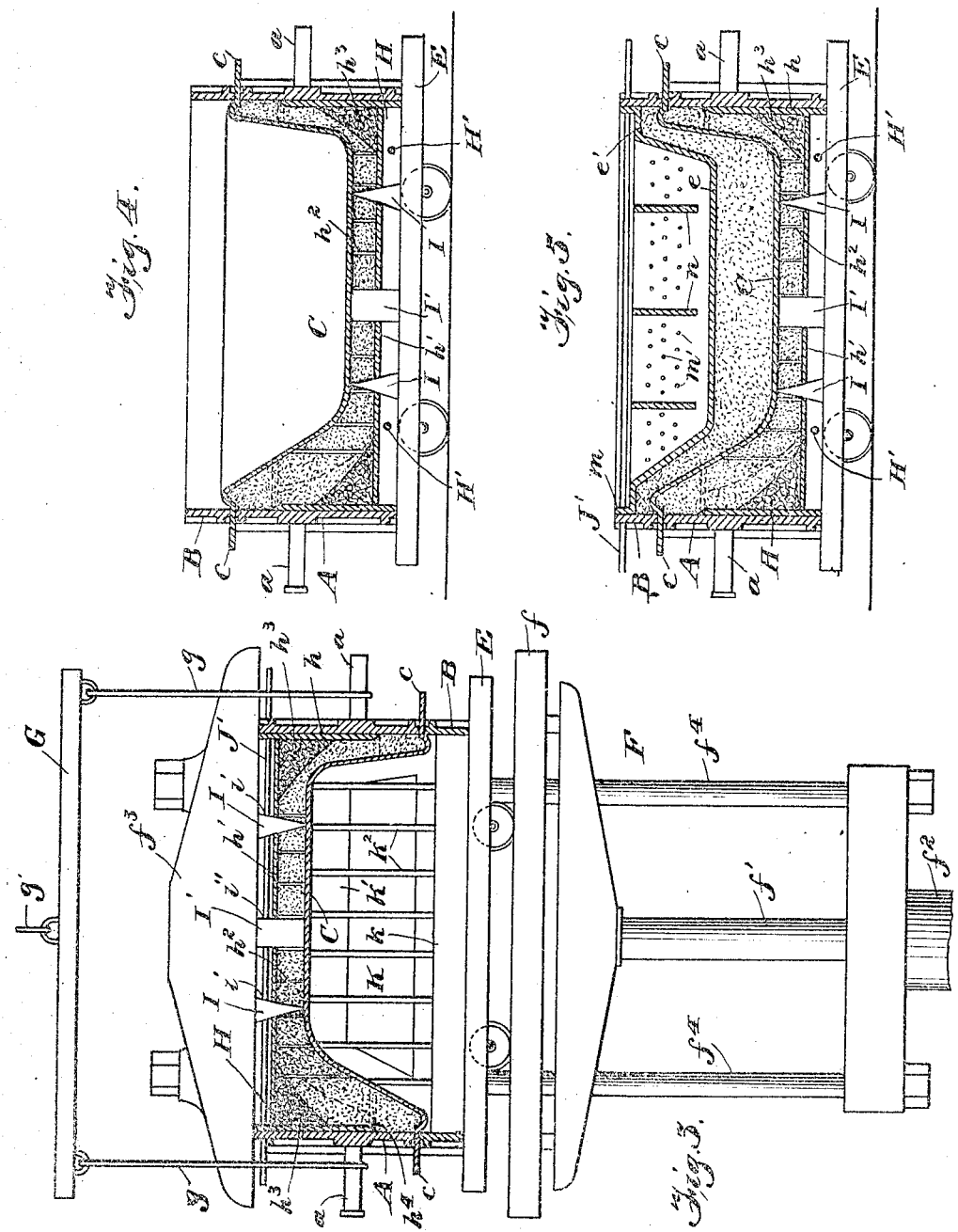

No. 892,142. PATENTED JUNE 30, 1908.
P. DUPONT.
APPARATUS FOR MOLDING.
APPLICATION FILED MAY 18, 1905.
4 SHEETS—SHEET 4.
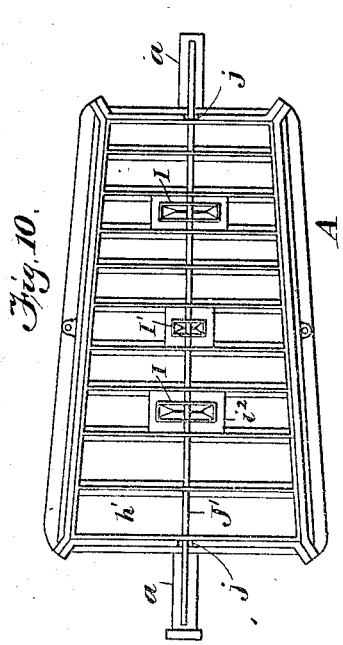
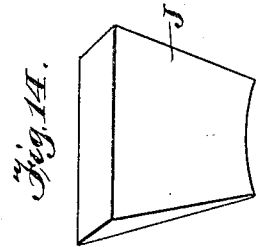
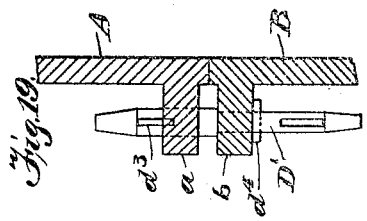
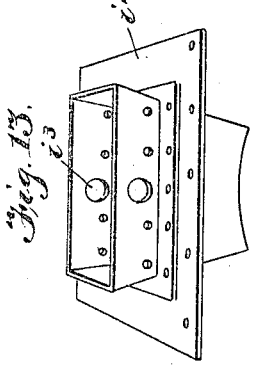
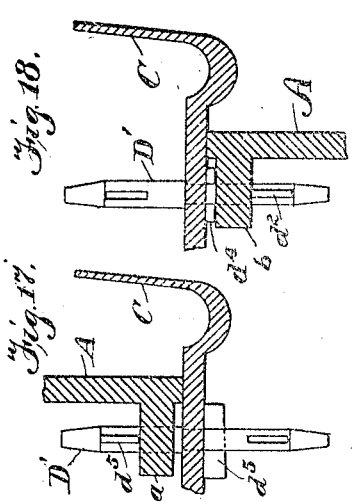
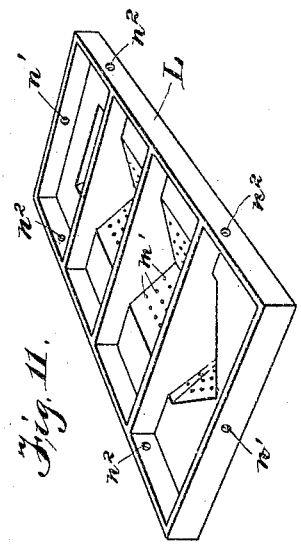
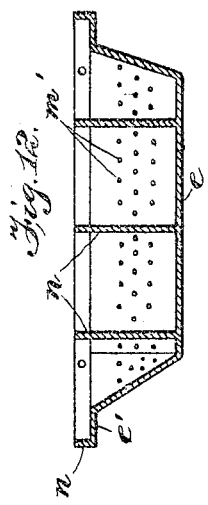
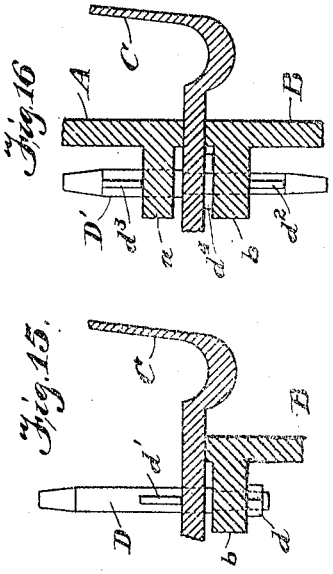
WITNESSES:
Robert Head
V. E. Nichols
INVENTOR
Paul Dupont,
BY
Griffin & Bronhard
ATTORNEYS

UNITED STATES PATENT OFFICE.

PAUL DUPONT, OF LE CATEAU, FRANCE.

APPARATUS FOR MOLDING.

No. 892,142.

Specification of Letters Patent.

Patented June 30, 1908.

Application filed May 13, 1905. Serial No. 261,058.

*To all whom it may concern:*

Be it known that I, PAUL DUPONT, a citizen of the Republic of France, residing at Le Cateau, Nord, in the Republic of France, have invented certain new and useful Improvements in Apparatus for Molding, of which the following is a description.

My invention relates to an apparatus for molding, the same being especially designed for use in casting hollow articles of large dimensions, such as bath tubs, basins and the like.

The object of my invention is the provision of means for molding sand in a way to secure uniform compression thereof upon the respective sides of a pattern.

My apparatus obviates the necessity for lubricating or "slicking" the mold, which constitutes one of the defects of molding by hand and requires a considerable amount of time for its performance. Furthermore, the apparatus may be operated by an unskilled workman, thus securing economy in the labor employed.

According to one part of my invention, I employ a two-part flask, a pattern confined between the parts of the flask, and a compressor or rammer adapted to enter one part of the flask and to coöperate with one side of the pattern in molding a body of sand, or the matrix of a mold. This compressor is of novel construction for the purpose of distributing the sand at an early period in the application of the pressure, and for compressing the sand at the last stage of the pressing operation. Said compressor is locked to one part of the flask at the end of the step of compressing the sand, and it remains attached to said part of the flask during the subsequent operations of molding sand in the other part of the flask and of the use of the flask in the casting operations.

Another part of the invention consists in the employment of a backing for the pattern during the first operation of compressing the sand. This backing prevents the pattern from bending under the pressure applied thereto and to the sand, and it is removed from the flask and the pattern prior to the step of inverting the flask.

Another part of the invention consists in the combination of the flask and a male (or second) compressor for compressing a second body of sand, (or the patrix) in another part of the flask and against the other side of the pattern, and means for locking the second compressor to the last named part of the flask, so that the second compressor remains attached to the flask for holding the patrix body of sand in proper condition during the subsequent use of the mold.

The invention further consists in the use of devices for locking the two parts of the flask either directly to each other, or with an interposed pattern, or for locking the pattern to one or the other parts of the flask.

The invention further consists in the combination and construction of parts as will be hereinafter described and claimed.

Reference is to be had to the accompanying drawings forming a part of this specification, wherein like characters of reference are used to indicate corresponding parts in all the figures.

Figures 1, 2 and 3 are sectional views through my molding apparatus in operative relation to a press, showing different stages of progress of the work of molding the sand in the cope of the flask. Fig. 4 is a sectional elevation through the flask in an inverted position to bring the drag uppermost preliminary to molding another body of sand in the flask. Fig. 5 is a sectional elevation similar to Fig. 4, showing the second body of sand or the patrix molded between a male compressor and the pattern. Fig. 6 is a sectional elevation showing the operation of opening the flask preliminary to withdrawal of the pattern from the cope. Fig. 7 is a sectional elevation of the flask with the pattern removed and the molded sand assembled ready for casting. Fig. 8 is a cross sectional view through a part of the press showing the flask on a wheeled truck and with suitable guide devices for centering the flask with relation to a compressor. Fig. 9 is a detail perspective view of a reinforcing device adapted for use in connection with one side of the pattern during the operation of pressing the sand in the cope and between said pattern and a rammer or compressor. Fig. 10 is a plan view showing the cope and a female compressor fitted therein, said compressor containing pouring gates, and a vent. Fig. 11 is a detail perspective view of the male compressor. Fig. 12 is a vertical longitudinal section through said compressor. Fig. 13 is a detail perspective view of one of the removable pouring gates. Fig. 14 is a detail view of a gate former or pattern adapted for use interchangeably with the pouring gate. Figs. 15 to 19 inclusive, illustrate detail sectional views through parts of the flask and the pattern showing different adjustments of devices for locking the members of the flask and the pattern as required in the several stages of the molding operation.

The flask which I employ is in two parts, consisting of a cope A, and a drag B. These parts are suitably constructed for the accommodation of a pattern C, and they are adapted to be assembled in matching or registering relation when the pattern is withdrawn, in order that they may be locked or fastened directly together. The pattern C conforms to the object which is to be cast in the flask of the molding apparatus, and as shown, this pattern is provided with a marginal flange $c$, arranged to fit between the meeting edges of the cope and the drag when the flask is assembled in the position shown by Figs. 1 to 4 inclusive. Said flange of the pattern is provided with perforations, adapted to register with perforations in lugs $a$, $b$, of the cope and the drag A, B, respectively, whereby the parts may be locked or held together by means of the bolts D, see Figs. 15 to 19 inclusive. As shown by Fig. 15, the bolt is provided with a nut $d$ at one end and with a key $d'$ for the purpose of locking the pattern C to one part of the flask, but this form of bolt may be changed in the construction shown by Figs. 16 to 19, wherein the bolt $D'$ is constructed to receive the keys $d^2$, $d^3$, and a pin $d^4$. This bolt $D'$ is adapted to pass through the lugs of the two parts of the flask, and a pin $d^4$ separates the flange of the pattern from the lug of the drag B, thereby locking the pattern in a fixed position between the two parts of the flask and also locking said parts of the flask to each other. In Fig. 17, the cope A of the flask and the pattern C are held firmly together by a bolt $D'$ and wedges $d^5$ $d^6$. The same parts are shown by Fig. 18, wherein the bolt $D'$ is used to fasten the pattern to one part of the flask.

In Fig. 19 the bolt $D'$ fastens the two parts of the flask to each other by the pin $d^4$ and the key $d^3$.

The flask, containing the pattern between the parts thereof, is adapted to be placed on a wheeled truck E of any suitable construction, and this truck with its load may be run upon the platform $f$ of a suitable power press. This press is represented by Figs. 1, 2 and 3, as a hydraulic press, the plunger $f'$ of which is adapted to work in the cylinder $f^2$. The press is equipped with a head $f^3$, which is connected by rods or members $f^4$, with a stationary part of the press structure. The construction of the press is not a material part of this invention, and I may use any suitable means for exerting pressure upon the parts of the molding apparatus for the purpose of compressing the sand in the flask. The flask is adapted to be inverted or reversed at certain stages in the operation of molding the sand therein, and for this purpose I provide the cope A of said flask with trunnions $a$, and employ means for suspending said flask below the head of the press. As one means for suspending the flask, or the cope thereof, I may employ a suspension bar G, and suitable links or stirrups $g$, the latter being adapted for engagement with the trunnions $a$. These links or stirrups are connected with the suspension bar G and this bar is operated by a rope or cable $g'$ connected with the middle portion thereof, said rope or cable being adapted to be coiled on a windlass or other operating device.

The suspension device is also adapted for use in holding a compressor H in a firm position against the under side of the press head $f^3$. Said compressor consists of a frame $h$, a perforated top plate $h'$, a plurality of ribs $h^2$, and a suitable filling $h^3$. The frame $h$ of the compressor is of such shape and proportions as to fit snugly within the cope A of the flask, and this frame is provided at its lower edge with a bevel $h^4$, thus providing a sharpened lower edge of the compressor frame for the purpose of making it pass easily through the sand in the cope A during the operation of assembling the flask and the compressor. The top plate $h'$ of said compressor is joined in a suitable way to the frame $h$, and it is provided with numerous openings for the escape of gases during the casting operation. The filling $h^3$ may be of concrete, or any other appropriate material, and this filling occupies the corners of the compressor, the under face of the filling being inclined or concaved and presenting a working surface which conforms to certain portions of the pattern C. The ribs $h^2$ are provided within the compressor H, and they extend longitudinally and transversely of said compressor, said ribs extending beyond the concave face of the filling $h^3$. These ribs strengthen the compressor, and they operate to prevent displacement of the sand during the operation of compressing the same between the pattern and the compressor H. The top plate $h'$ of said compressor is provided with openings $i$ $i'$, the same being larger than the perforations in said top plate. The openings $i$ are intended to receive the gate formers or patterns J during the operation of molding the sand in the cope of the flask, for the purpose of forming the gates in the molded body of sand, after which the gates are removed so that they may be replaced by the pouring gates I and the vent I'. One pouring gate or vent is shown in detail in Fig. 13, from which it will be seen that said device is provided with a flange $i^2$, adapted to rest on the plate $h'$ of the compressor. Each pouring gate I and the vent I' is provided with transverse openings $i^3$, and said gates and vent are arranged for the openings $i^3$, to register with similar openings in the ends of the frame h of the compressor, thus permitting a rod J' to be passed through the compressor frame, the gates and the vent after the sand is molded by compressing it between the pattern and the compressor H. Said rod J' serves a double purpose; first, as a means for the attachment of the stirrups g by which the compressor may be suspended from the head of the press, prior to the entry of the compressor H into the cope, as shown in Fig. 1; and, second, after sand is molded and compressed, the rod J' (or one similar to it), may be used for locking the compressor to the cope and for locking the pouring gates and the vent in position on said compressor. Said rod is adapted to pass through the compressor above the plate h', and is adapted also to fit in notches j, provided in the top edge of the cope A when the compressor is forced into the cope as in Fig. 3. It will be seen that the suspension rod J' extends beyond the flask, and this rod is adapted to be engaged by the links or stirrups g, whereby the compressor may be held firmly in place against the underside of the press head f².

It will be noted that the pattern is confined at its edge portion between the parts of the flask, that part of the pattern which projects into the cope being unsupported at points intermediate of its length and width. The operation of molding the sand upon and around a pattern of large dimensions, subjects the unsupported part of the pattern to considerable pressure. It is found that the pattern will bend under this pressure, particularly when molding the sand between the compressor H and the pattern which extends into the cope. To effectually overcome bending of the pattern, and to materially stiffen and strengthen it within the flask, I employ a reinforcing device represented in detail by Fig. 9, and in its working position by Figs. 1, 2 and 3. Said device consists of a skeletonized frame K, comprising a base k, a series of longitudinal members k', and a plurality of transverse members k², said members being attached to the base k in any suitable way. The members k¹ k², are curved or fashioned to produce a reinforcing device, the profile of which corresponds to the interior contour of the pattern C. The base of this reinforcing device is adapted to rest on the truck E, and the members of said device fit into the pattern for the purpose of having engagement with said pattern at numerous lines transversely thereof, whereby the reinforcing device is made to serve the purpose of a brace or stay for the unsupported parts of the pattern, and any tendency of the pattern to bend or buckle is effectually overcome when the sand is subjected to compression between said compressor H and the pattern.

In the operation of molding sand in the cope A of the flask, the compressor is suspended against the under side of the press head by the links g, engaging with the rod J'. The flask with the pattern attached thereto is placed on the truck, the reinforcing device K being within the pattern C, and the parts are run upon the platform f. For the purpose of centering the truck and the flask within the press, I provide a detent K', the same consisting of a plate or block which is pivoted at k³ to the truck E, said detent being foldable on the truck to the dotted line position shown by Fig. 8, but when said detent is unfolded it is adapted to engage with one of the rods f¹ of the press, whereby the truck is guided by the detent sliding against the press rod on the rise and fall of the press platform. After the compressor shall have been suspended, and the truck with its load placed in the required position, the press platform lifts the flask and the pattern, thus enabling the compressor to be centered accurately with respect to the flask. The flask and platform are now lowered, and the cope A is filled or charged lightly with ordinary molding sand, the sand being filled to the level of the cope and resting upon one side of the pattern. The platform and flask are again raised and the lower part of the compressor frame h is made to enter the upper part of the cope A. When the compressor frame enters the cope to the depth indicated by Fig. 2, the edge h⁴ of said frame operates on the sand for the purpose of displacing it laterally with respect to the walls of the flask, and at this stage in the operation of molding the sand, it is uniformly distributed over the pattern without, however, subjecting the sand to sufficient pressure to compress it to the required density. On the continued upward movement of the flask and pattern, the compressor is forced entirely within the cope, substantially to the position shown by Fig. 3, and this operation compresses the sand uniformly between the pattern and the under side of the compressor H. It will be understood that the compressing force only takes place during the last few centimeters of the upward movement of the flask, at which time the compressor is embedded into the sand. The first and long part of the upward movement of the flask makes the compressor coöperate with said flask exclusively in securing an even distribution of the sand, thus putting the sand in a good condition to be compressed at the last part of the movement of said flask. While the flask and platform f are in their raised positions, the compressor H is locked to the cope A by means of suitable pins or rods H', which are thrust transversely through suitable openings in the frame of the compressor and the sides of the cope, as indicated by Figs. 4, 5, 6, and 7 of the drawings. The stirrups g are now disengaged from the suspension rod J', the suspension bar G is lowered, and the stirrups are connected with the trunnions $a$ of the flask. The platform, truck E and the reinforcing frame K are now lowered away from the flask, which remains in a suspended position below the press head, and the bar G with the link $g$ are now lowered sufficiently to move the flask below the press head, for the purpose of inverting or reversing the position of the flask. The flask having been inverted or turned upside down to the position of Fig. 4, it is deposited upon the truck E, and the stirrups $g$ are disengaged from the trunnions $a$, thus placing the flask in the position of Fig 4, wherein the drag B is uppermost.

The apparatus is now in position for molding the sand against the other side of the pattern and within the drag B, but before proceeding to deposit the sand in the inverted mold of Figs. 4 and 5, I first place a second or male compressor L in position on the under side of the press head $f^3$, said compressor being held in place by the rod J', which is connected with the suspension bar G by the stirrups $g$. This male compressor is shown in detail by Figs. 11 and 12 of the drawings, which represent the said compressor as being cast in a single piece of metal. This compressor is coniform or frusto-pyramidal in shape, that is to say, it has a tapering or wedge shaped body portion, $e$, the latter being provided with a flange, $e'$, see Figs. 7 and 12. The wedge shaped part of said compressor has numerous perforations as indicated at $m'$, and within the hollow compressor is a plurality of strengthening webs or flanges $n$. From the flange, $e'$, of the compressor, L, extends another flange, $n$, see Figs. 7, 11 and 12, and in the portions of said flange, $n$, at the ends of said compressor are the openings, $n'$, see Fig. 11, and said flange $n$ has transverse openings $n^2$ at the sides of the compressor. Through the openings $n'$ is adapted to pass the suspension rod J', and this rod is adapted to hold said compressor L against the under side of the press head in the same manner in which the compressor H was held by the same rod.

Having inverted the flask, and placed the compressor L in position, the truck and the flask are run upon the platform $f$, which is raised so as to properly center the compressor L with respect to the drag B. The flask is now lowered, and charged or filled with sand, the latter resting loosely against the pattern and filling the cope to the level of its top edge. The platform is now raised so as to make the compressor L enter the drag, and said compressor acts on the sand for the purpose of compressing the sand between itself and the upper side of the inverted pattern, as represented by Fig. 5. The compressor is locked to the drag by passing suitable locking pins N, through the perforations $n^2$ in the sides of the compressor and suitable openings in the sides of the drag, see Figs. 6, 7 and 8. With the compressors H and L locked to the cope and drag A B of the flask, as indicated by Fig. 5, and with the platform and truck in their raised positions, the stirrups $g$ are disengaged from the rod J', and said stirrups are connected with the trunnions $a$, thus suspending the flask independently of the truck E and the platform. Said platform and the truck are lowered and the suspended flask is lowered a sufficient distance for it to be inverted or restored to its first position, after which the truck E is raised, in order to engage with the drag B and the compressor L. The locking devices D' are now manipulated to release the drag from the pattern in the cope, and to connect the flange of the pattern with said cope. The parts are now struck lightly so as to loosen the molded body of sand, or patrix, from the hollow side of the pattern, and the platform is lowered so as to withdraw the truck, the drag and the molded sand resting on the compressor L from the pattern and cope, these last mentioned parts remaining suspended as indicated by Fig. 6. The truck E and its load are now wheeled out of position, and another truck is run into place and lifted quite close to the pattern C. The pattern is now struck lightly and it is unlocked from the cope, thereby depositing the pattern upon the truck, and leaving the cope, the compressor H and the molded sand suspended, as shown by Fig. 6. The truck E and its load are now replaced below the suspended cope, and the platform is raised to bring the two molded bodies of sand into registration one with the other, substantially as shown by Fig. 7, after which the parts A, B, of the flask are locked together by the bolts D', as indicated by Fig. 19. After having molded the sand between the compressor H and the pattern C, as shown by Fig. 3, and after the flask shall have been lowered previous to inverting the same, the upper part of the cope A becomes accessible so that the temporary gate formers or patterns J may be removed. These parts are replaced by the pouring gates I and the vent I', shown in Fig. 13, the same having the shape of the openings left in the sand by the gate formers or patterns. The sand is built up by hand around the holes up to the level of the upper edge of the compressor H. Air holes are pricked in the sand by means of a molder's needle, which is introduced through the holes of the perforated plate $h'$ of the compressor H, said holes forming vent openings through the sand and the compressor for the gases during the casting of the metal. The same operation of making vents in the sand of the patrix is performed after the sand shall have been molded between one side of the pattern and the compressor L, by thrusting a molder's needle through the perforations $m'$, in the compressor L.

In the operation of molding the sand in the drag, as shown by Fig. 5, it is necessary to exercise care in removing the foot bearing prints which are provided on the pattern, and to replace them by suitable cores which will provide the necessary holes for the introduction of bolts that serve to fasten the feet of the cast metal bath tub. After having prepared the two masses of sand, and assembled them as in Fig. 7, it is only necessary to pour in the metal through the gates I, as in the ordinary practice.

Having thus described my invention, what I claim as new and desire to secure by Letters Patent is:—

1. In a molding machine, a frame, a compressor, means for holding the compressor removably on the frame, a reversible two-part flask, a pattern adapted to be held within said flask and to be connected to the individual parts thereof, and means for giving movement to the flask, or either part thereof, relative to the compressor.

2. In a molding machine, a frame, a reversible two-part flask, a pattern, means for locking said pattern to either part, or to both parts, of said flask, a compressor, and means for removably supporting the compressor on said frame in a position to enter the flask.

3. In a molding machine, the combination of a flask, a pattern, a rammer or compressor arranged to enter the flask and to coöperate with the pattern, and means for locking the rammer or compressor to the flask.

4. In a molding machine, the combination of a flask, a pattern therein, a compressor, means adapted to suspend the compressor in a fixed position and in the path of the flask, and means for locking the compressor to the flask subsequent to the compression of sand between the pattern and the compressor.

5. In a molding machine, the combination of a reversible two part flask, a pattern held in and reversible with the flask, a support for interchangeable compressors, means on said support for holding the individual compressors in coöperative relation to the separate parts of the flask, and means for locking the separate compressors to the respective parts of the flask.

6. In a molding machine, a flask, a pattern, a male compressor having a substantially wedge-shaped body adapted to coöperate with a hollow side of the pattern to distribute the sand over the pattern, and thereafter compress the sand against the pattern, and means for locking said compressor to the flask subsequent to the compression of the sand.

7. In a molding machine, a flask, a pattern, a male compressor having a substantially wedge-shaped body adapted to distribute the sand over, and compress the sand against the pattern, means for supporting said compressor in the path of the flask, and means for locking the compressor to said flask.

8. In a molding machine, a compressor comprising a hollow casing having a filling presenting a concave pressure surface, and internal ribs extending beyond said surface.

9. In a molding machine, a flask, a compressor with an open side embodying a frame having a beveled lower edge, and a concave pressure surface confined within said frame and above the beveled edge thereof, said pressure surface being adapted to enter said flask well below the upper edge thereof so as to operate to exert lateral pressure upon sand confined within the flask.

10. In a molding machine, a compressor provided with a concave pressure surface, ribs extending beyond said pressure surface for retaining the sand in place during the casting operation, and suitable gate-formers independent of the pattern to be molded and extending through one of the walls of the compressor.

11. In a molding machine, the combination of a compressor, gate formers fitted removably thereto, and a suspension rod for the compressor, said rod locking the gate formers to the compressor.

12. In a molding machine, the combination of a notched flask, a compressor adapted to enter the flask, and a suspension rod connected removably to the compressor and adapted to occupy the notches of the flask.

13. In a molding machine, the combination with a press, of a compressor, a suspension device adapted to hold the compressor in the press, and a flask adapted to be raised by the press to receive the compressor; said suspension device being adapted for engagement with the flask to suspend the same for inversion in the press.

14. In a molding machine, the combination of a two-part flask, a pattern therein, a compressor adapted to coöperate with one side of the pattern, means for locking the compressor to one part of the flask, means for suspending the flask, whereby the flask with the pattern and compressor may be inverted, another compressor adapted to coöperate with the other side of the pattern, and means for locking the second named compressor to the other part of the flask.

15. In a molding machine, a two-part reversible flask, a pattern adapted to be held between the parts of said flask, and means whereby the pattern may be locked either to one part or the other of said flask, said means also operating on the withdrawal of the pattern to lock the two parts of the flask to each other.

16. In a molding machine, the combination of a two-part flask, a pattern, and locking devices adapted to fasten the parts of the flask together, to fasten the pattern to either part of the flask, or to be unlocked so as to permit the withdrawal of one part of the parts of said flask from the pattern.

17. In a molding machine, a cope, a drag, a pattern, and means for locking said pattern either to the cope or to the drag, or for locking said pattern between said cope and drag.

18. In a molding machine, a cope, a drag, a pattern, and bolts provided with means for locking the pattern either to the drag or to the cope, or for holding said pattern between said cope and drag.

19. In a molding machine, a cope, a drag, a pattern, and bolts adapted to engage with said pattern, cope and drag, said bolts being provided with keys and nuts adapted for locking the pattern either to the drag or to the cope, and for locking the pattern, the drag and the cope together.

20. In a molding machine, a reversible two-part flask, two compressors, and means for locking said compressors individually to the respective parts of the flask.

21. In a molding machine, a reversible two-part flask, two compressors, means for holding the separate compressors in coöperative relation to the individual parts of the flask, and means for locking the individual compressors to the respective parts of the flask.

22. In a molding machine, a reversible two-part flask, two compressors, means for locking one compressor to one part of the flask, and means for locking the other compressor to the other part of the flask.

23. In a molding machine, a compressor comprising a hollow casing reinforced by an internal filling, said filling presenting a substantially wedge-shaped pressure-surface adapted to distribute the sand over a pattern within a flask without compressing the sand against said pattern, and also adapted to compress the sand upon said pattern.

In testimony whereof I have hereunto signed my name to this specification in the presence of two subscribing witnesses.

PAUL DUPONT.

Witnesses:
GEORGES BRAUN,
GUSTAVE LEGROUN.